United States Patent [19]

Reichle et al.

[11] Patent Number: 4,935,643
[45] Date of Patent: Jun. 19, 1990

[54] DEVICE FOR THE LIMITATION OF TORQUE IN A HAIR TREATMENT DEVICE

[75] Inventors: Heinz Reichle, Lenningen; Gerhard Stotz, Eislingen, both of Fed. Rep. of Germany

[73] Assignee: ABC-Elektrogeräte Volz, GmbH & Co., Kirchheim/Teck, Fed. Rep. of Germany

[21] Appl. No.: 260,821

[22] Filed: Oct. 21, 1988

[30] Foreign Application Priority Data

Oct. 24, 1987 [DE] Fed. Rep. of Germany ....... 3736098
Apr. 1, 1988 [DE] Fed. Rep. of Germany ....... 3811188

[51] Int. Cl.⁵ .............................................. H02H 3/08
[52] U.S. Cl. ..................................... 307/131; 307/124; 301/57; 34/96; 34/101; 132/227; 132/238
[58] Field of Search ..................... 301/1, 54, 56, 57; 307/116, 119, 124, 125, 130, 131, 326; 132/227, 237, 228; 34/96, 101

[56] References Cited

U.S. PATENT DOCUMENTS

| | | | |
|---|---|---|---|
| 4,409,998 | 10/1983 | Bauer | 132/9 |
| 4,426,588 | 1/1984 | Weilenmann | 307/124 |
| 4,591,944 | 5/1986 | Gravel | 307/124 X |
| 4,792,735 | 12/1988 | Kim | 361/57 |

*Primary Examiner*—Derek S. Jennings
*Attorney, Agent, or Firm*—Marmorek, Guttman & Rubenstein

[57] ABSTRACT

In a hair treatment device with a winding mandrel driven by a motor and used to wind up hair, the current used by the motor is led through a current limiter circuit in order to limit torque. The current limiter circuit comprises an operating stage and a safety stage. The safety stage is utilized to limit current if the operating stage fails.

6 Claims, 3 Drawing Sheets

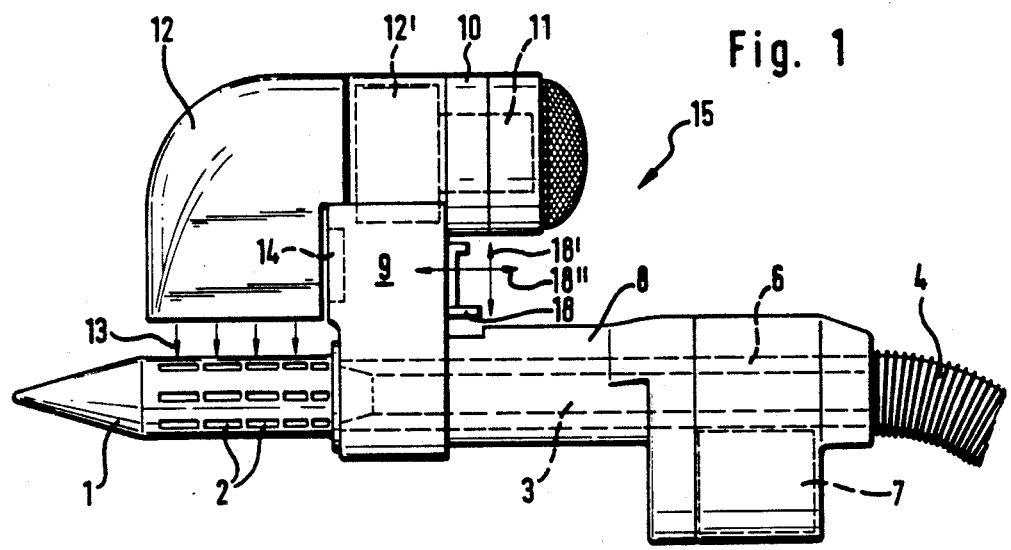
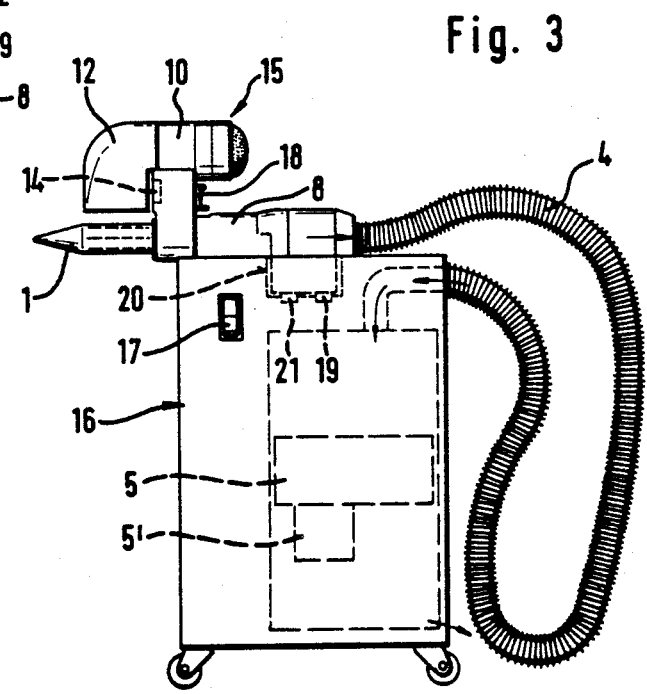

DEVICE FOR THE LIMITATION OF TORQUE IN A HAIR TREATMENT DEVICE

FIELD OF THE INVENTION

The instant invention relates to a device for the limitation of torque in a hair treatment device with a motor-driven winding mandrel for winding up hair.

BACKGROUND OF THE INVENTION

Such a hair treatment device is known from EP-Bl 0052 325. The winding mandrel has a smooth surface. Hair is wound up on it. At the same time it can be subjected tangentially to the flow of heated air coming from the outflow nozzle of a hair dryer. The winding mandrel is equipped with openings which are connected to a negative pressure source, so that the hot air flowing from the hair dryer can be sucked away through the hair via a suction air channel and a suction circuit. In this manner the hair wound on the winding mandrel is dehumidified, dried and shaped rapidly.

The hair is received by the rotating winding mandrel due to the negative pressure taking effect at the openings. When the hair is wound up, the winding mandrel continues to rotate. The hair which does not continue to rotate with it slides on the rotating winding mandrel. Normally the friction force between the rotating winding mandrel and the hair which does not turn with it is so low that the traction exerted upon the hair by the friction force is not felt unpleasantly. In individual cases it may be however that the torque is too great so that "pulling" on the hair is unpleasantly felt. For this purpose the cited published document discloses that the winding mandrel is to be driven via a friction or sliding coupling so that if the hair catches on the winding mandrel for any reason, a mechanical torque limitation occurs.

This known torque limitation does not always function satisfactorily. This is because it is based, as the very terms sliding coupling or friction coupling express, upon the fact that two elements rub against each other when a certain torque is exceeded. However these conditions depend very much on outside factors such as for example the chemical composition of the ambient atmosphere. It may also occur that the hair catches in the suction openings of the winding mandrel. The traction force can also increase when the hair is very wet. Furthermore, special conditions may exist when long or especially thin hair is involved, or when a person is especially sensitive.

It is therefore the object of the instant invention to provide a device of the type mentioned initially so that the torque exerted by the winding mandrel upon the wound-up hair may be limited, with an especially high degree of safety in a reliable and simple manner, to a definite adjustable value.

SUMMARY OF THE INVENTION

The present invention eliminates the above-mentioned disadvantages of presently available hair treatment devices and provides for electronic regulation of the torque to a maximum value. The present invention makes use of the known fact that the current used by a drive motor increases as the torque increases, and therefore utilizes an electronic current limitation. It thereby produces reliable limitation of the torque which can be exerted by the winding mandrel upon hair. The torque can for example be limited to 9 or 10 Ncm. This approximately represents the pain threshold of a sensitive person.

The current limitation switch elements can be known electronic voltage regulator IC's, e.g. of the type SGS 317 T. The operation of this device is based upon the fact that in a flow of current lower than a set value, the voltage drop at a control connection is very low. If the current flow through the current limitation switch element approaches a certain value, the voltage drop at the control connection increases and is applied for internal regulation. The regulation, via the regulation of a control voltage, causes the current flow to be limited to a given adjustable value. For this purpose an adjustable resistance, e.g. a potentiometer is connected at a control connection of the current limitation switch element, and with its help a torque limitation can be set.

To be substantially certain that the torque is always limited, two current limiting circuits may be utilized. Even when a first current limiter circuit acting constantly as an "operating" stage should fail, provisions are furthermore made for a second current limiter circuit to be inserted as a "safety stage" and to be connected in series with the "operating" stage. The current to which the safety stage is set is slightly higher than the current to which the operating stage is set. Thus, if for any reason the operating stage should fail, regulation to a slightly higher value is effected by the safety stage. This condition, i.e. the elimination of the operating stage, is indicated by an indication device, preferably by a light-emitting diode (LED). The operator is thus informed that maintenance is to be performed. The optical indication indicates that the second current limiter circuit element has been activated for regulation because the first current limiter circuit element has failed.

In order to be able to recognize malfunction of the safety stage also, provisions are made for the power supply to the hair dryer to be switched on each time a hand-held part of the hair treatment device is taken out of a holster of a non-hand-held part of the hair treatment device and for the output of the safety stage, triggered by this switching process, to be grounded for a brief control period via a defined resistance. The voltage at the resistance is thus checked and if it is higher than permissible, i.e. in case of a malfunction of the safety stage, an indicator is activated. Thus the safety stage is also checked constantly. As a third safety feature (for the case that the safety stage should also fail), a fuse is furthermore provided. Finally, a test switch can be provided to advantage inside the device to check the safety and operating stages after assembly and to test the next stage whenever one stage is skipped.

BRIEF DESCRIPTION OF THE DRAWINGS

FIG. 1 shows a schematic view of a hand-held part of a hair treatment device;

FIG. 2 shows a front view of the device of FIG. 1 to explain the swiveling positions of an outflow nozzle of a hair dryer which, by a reversing of the direction of rotation, is always activated in such manner that wound-up hair is subjected to a tangential flow;

FIG. 3 shows an overall view of the hair treatment device comprising a hand-held part and a non-hand-held travelling part;

Figure 4:
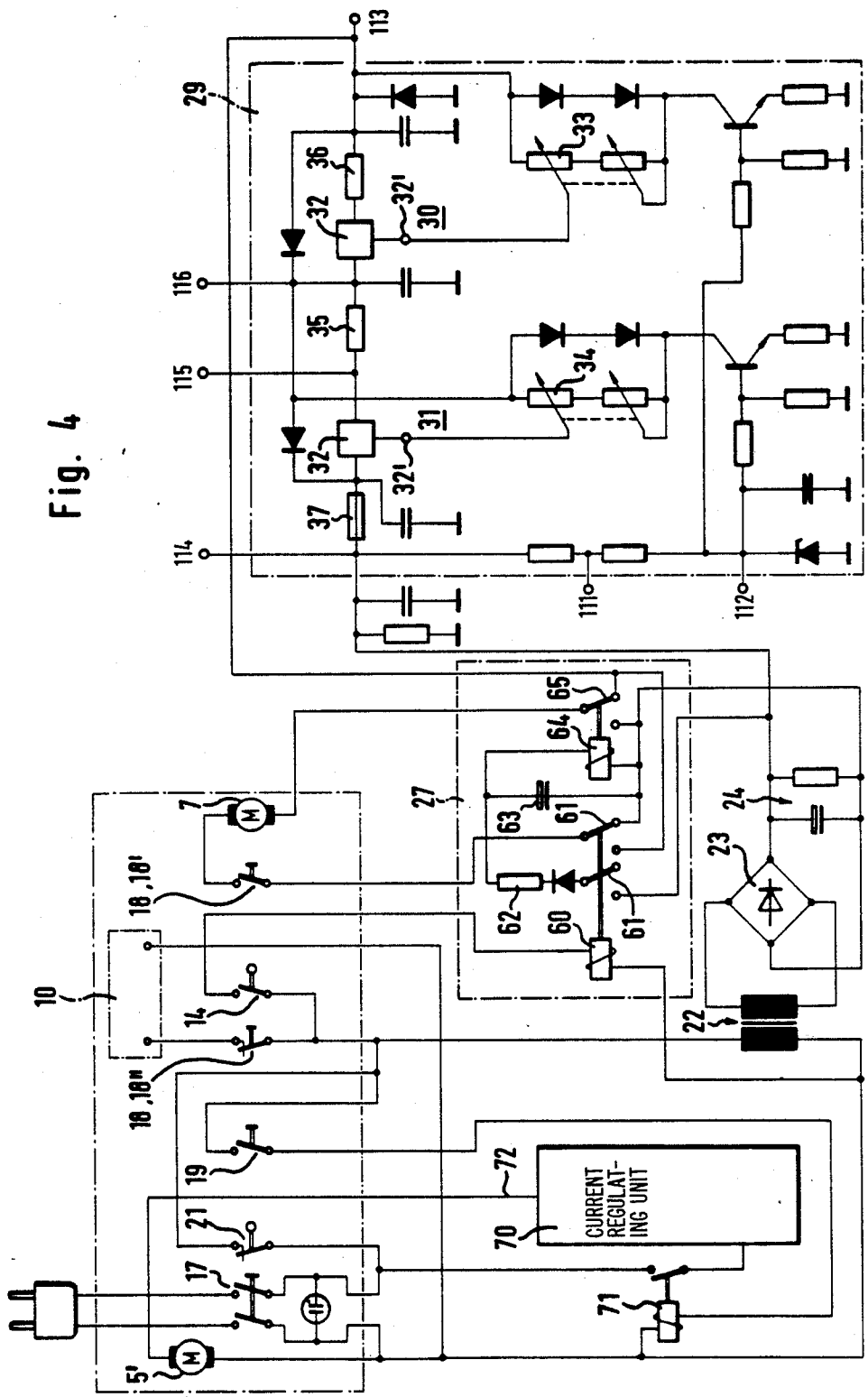
FIG. 4 is a diagram of the triggering mechanism of the hair treatment device, including a current limiter circuit.

The embodiments of the invention shown in the FIGS. 1–5 are intended to be illustrative only.

DETAILED DESCRIPTION OF THE INVENTION

According to FIG. 1, a hand-held part 15 of a hair treatment device comprises, a winding mandrel 1 which is hollow and is provided with openings 2. The openings 2 are connected to a suction air channel 3 and a suction circuit 4 with a source of negative pressure in form of a blower 5, driven by a motor 5' in combination (see FIG. 2). The winding mandrel 1 is held in a rotatably supported sleeve 6 in which the suction air channel 3 is also provided and which is driven by a motor 7.

The handle 8 which is held by the hand of the operator when working with this hair dressing device is equipped with a housing element 9 on which a hair dryer is located. The hair dryer 10 is constituted by blower 12' driven by a motor 11. The hair dryer 10 is furthermore provided with appropriate heating coils (not shown). Hot air emerges via an outflow nozzle 12 and is at the same time deflected at a right angle so that the hot-air stream 13 can reach the hair wound up on the winding mandrel 1 at a right angle. The outflow nozzle 12 is installed in the hair dryer 10 in such manner as to be capable of swiveling (see FIG. 2) so that the hair wound up on the winding mandrel 1 is tangentially subjected to the flow of hot air in either direction of rotation of the winding mandrel 1. A rotational direction reversing switch 14 installed in the housing part 9 is provided for the swiveling movement.

The hand-held part 15 as shown in FIG. 1 can be taken out of the holster 20 of the non-hand-held travelling part 16 (FIG. 3) which also holds the blower 5 and motor 5'. A main switch 17 is installed on the travelling part 16. A multi-function key 18 capable of executing a tilting movement and an up-and-down movement is installed on the housing part 9 of the hand-held part 15. The up-and-down movement 18' serves to switch the motor 7 of the winding mandrel 1 on and off; the tilting movement 18" serves to switch the hair dryer 10 on or off. The travelling part 16 of the device contains an additional switch 19 which switches on the motor 5' of the blower 5 as soon as the hand-held part 15 is taken out of the holster 20. An additional switch 21 which closes a current circuit as soon as the hand-held part 15 is taken out of the holster 20 is also provided. This switching process is used to check the safety stage of the torque limitation circuit.

The drive motor 7 of the winding mandrel 1 receives current as follows: (see FIG. 4): The main switch 17 being closed, the switch 21 closes as soon as the hand-held part 15 is taken out of the holster 20. This brings current to the transformer 22 so that direct current becomes available at the output of the four-way rectifier 23 and the smoothing circuit 24. To reverse the polarity of the voltage applied to the motor 7 and thus to reverse the direction of rotation as a function of the position of switch 14, the reversing unit 27 is used. In each position of the switch 14, the current which also flows through motor 7 flows through the current limiter circuit 29 and is kept by it at a given value.

The current limiter circuit 29 has two stages, i.e. the operating stage 30 and a safety stage 31. The stage which actually carries out the current limitation is the operating stage 30; when it fails the safety stage 31 takes over the current limiting role. A current limiter circuit element 32, e.g. an IC module of the type SGS 317 T is provided in the operating stage 30. Such an element 32 is also found in the safety stage 31. The setting of the current value to which the current flowing from input to output is limited is effected for the operating stage 30 by means of the mechanically coupled double potentiometer 33 which is connected to the control connection 32' of the element 32. For the safety stage 31 this is carried out by means of the mechanically coupled double potentiometer 34. The diodes which are connected in parallel to the potentiometers serve to stabilize the voltage over these two potentiometers and over the downstream trimmers. The control voltages determined by the current limitation for the operating stage 30 and the safety stage 31 are set to various values via resistances 35 and 36. The value of the current limit for the safety stage 31 is set sightly higher than the current limit for the operating stage. The safety stage 31 is preceded by fuse 37 which melts and cuts off the current should the safety stage 31 also fail.

Normally, i.e. when the regulation function is assumed by the operating stage 30, the safety stage 31 is "skipped", i.e. it is subjected to no voltage drop. If however any malfunction occurs in the operating stage (e.g. a short-circuit) and if the safety stage 31 therefore now completely assumes the regulation of the current, it is subjected to a voltage drop. The latter can be sensed between terminals 114 and 115. The voltage between terminals 114 and 115 is indicated in an indicating and control unit 40 (see FIG. 5). This voltage causes a current to flow through resistance 41 and thereby also through the optocoupler 42. Via the optocoupler 42, a flow of current goes through the resistances 43, 44 and thereby the thyristor 45 is switched on. This switches on the LED flashing indicator 46 which is connected via terminal 111 (see also terminal 111 in FIG. 4) to a voltage. Due to the characteristic curve of the thyristor this condition (flashing indication) is maintained even when the switching signal goes off.

The following is provided in order to check safety stage 31 automatically and sufficiently in short intervals:

Each time the hand-held part 15 is taken out of the holster 20 in the travelling device part 16, the switch 21 is first caused to close (main switch 17 being already switched on) to put the transformer 22 under voltage. Thus, each time the hand-held part 15 is picked up for work, voltage is again built up at terminal 23' of the four-way rectifier 23. Part of the voltage produced is transferred via terminal 112 (see terminal 112 in FIGS. 4 and 5) to a NOR circuit 47 which can for example be made up of the digital IC's 4001 (see Siemens Bauteilservice, April 1987). Only when the capacitors 48 and 49 are charged up does the voltage at point 50 reach its final value which corresponds to a logical "1" at the inputs of the NOR element 51 and has a "0" at the output as a consequence. The base of the npn transistor 52 then becomes negative; the transistor blocks. Inversely, this means: each time the hand-held part 15 of the device is lifted out, the transistor 52 remains conductive for a brief checking period of approximately 40 ms determined by the capacity of the capacitors 48, 49 (that is to say until the base becomes negative). During this checking period the terminal 116 (see terminal 116 in FIG. 4) which is located between the safety stage 31 and the operating stage 30 is grounded via resistance 53. A defined voltage drop then occurs at the resistance 53, leading to a flow of current into the optocoupler 54 and thereby also to a drop in voltage at the resistance 44. If this voltage exceeds the switch voltage of the thyristor 45 the latter becomes conductive and leads to a triggering of the LED flashing indicator 46. This condition continues also after the checking period. In case of faulty functioning of the safety stage 30 (i.e. without current limitation) a continuous flashing indication thus occurs as soon as the hand-held part 15 is lifted out of the holster 20.

At the end of the checking period the npn transistor 52 becomes blocking. The ground connection of the resistance 53 is lifted. Now, in "normal" operation, the operating stage 30 takes over the function of current limitation.

Figure 5:
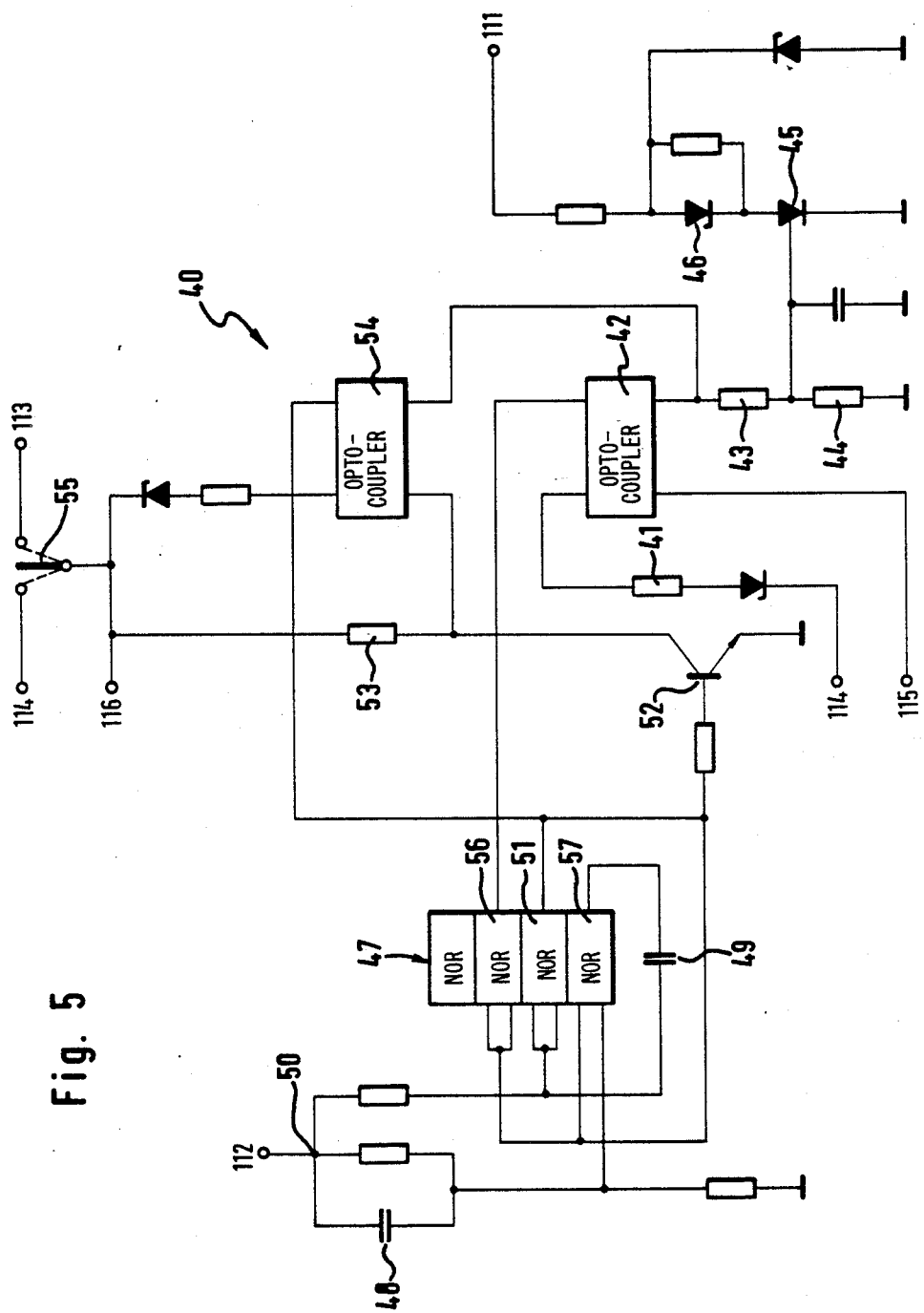
FIG. 5 is a diagram of an indicating and control unit.

The indicating and control unit 40 according to FIG. 5 is equipped with an internal testing switch 55. It serves to check the two current limiting steps 30, 31 after assembly and before the incorporation of the unit into the housing. In a position tilted to the left, switch 55 connects the terminals 114 and 116 together (see also their position in FIG. 4). The safety stage 31 is thus skipped, i.e. short-circuited. If the switch 21 is now closed simultaneously for a brief period and the npn transistor 52 is thereby rendered conductive in the described manner, a definite voltage drop occurs at the resistance 53 which, if it exceeds the admissible value, causes the thyristor 45 to switch and thereby the LED flashing indicator 46 to be switched on.

Tilting the testing switch 55 to the right produces a connection between terminals 113 and 116 (see these in FIG. 4) and thereby a bridging or a short-circuit of the operating stage 30. This leads to a verification of the safety stage 31 insofar as the switch 21 is also closed simultaneously for a brief moment and switches 18, 18' are also closed. The process is analogous to the one described in the preceding situation. Once the device has been assembled the switch 55 is no longer activated.

The reversing unit 27 (FIG. 4) works as follows: When the rotational direction reversing switch 14 is activated, the relay 60 is activated and reverses the working contacts 61. Only after a certain delay which is determined by the size of the resistance 62 and the capacitor 63, the relay 64 enters into action so that its operating contact 65 is changed from terminal 25 to terminal 26. In this manner the direction of rotation is changed over after a short pause.

FIG. 4 further shows the current regulating unit 70 for motor 5'. It is switched on. When a closing of the switch 19 causes the relay 71 to be activated, the output circuit 72 is activated correspondingly.

The optocoupler 42 as well as the resistances 43 are connected via the NOR element 56 to a positive voltage during the verification period and after closing of the switch 21. The NOR element 57 serves to discharge the capacitor 49 at the end of the verification period.

Insofar as individual resistances, Zener diodes etc. have not been discussed in particular, their functions are normal ones, easily recognizable in the instant context to the person of ordinary skill in the art.

Finally, the above-described embodiments of the invention are intended to be illustrative only. Numerous alternative embodiments may be devised by those skilled in the art without departing from the spirit and scope of the following claims.

We claim:

1. A hair treatment device comprising
   a winding mandrel for the winding of hair,
   a motor for driving the winding mandrel,
   a current limiter circuit including switching means for limiting a drive current of the motor to a predetermined value so as to limit the torque supplied by said motor, said current limiter circuit comprising first and second stages, said first stage being an operating stage and having a lower current limit value, said second stage being a safety stage which operates in the event of failure of said first stage and having a higher current limit value,
   wherein a signal is derived from a voltage at an input of said operating stage, said signal being connected to an input of a thyristor for switching the thyristor into a conductive state when a given threshold is exceeded to cause an indicator element to indicate a malfunction.

2. The device of claim 1 wherein the indicator is an LED.

3. The device of claim 1 wherein the discharge of said signal connected to said thyristor results from said voltage at said input of said operating stage by means of an optocoupler.

4. A hair treatment device comprising
   a winding mandrel for the winding of hair,
   a motor for driving the winding mandrel,
   a current limiter circuit including switching means for limiting a drive current of the motor to a predetermined value so as to limit the torque supplied by said motor, said current limiter circuit comprising first and second stages, said first stage being an operating stage and having a lower current limit value, said second stage being a safety stage which operates in the event of failure of said first stage and having a higher current limit value,
   wherein said hair treatment device comprises a hand-held part and a non-hand-held part including a support, said hand-held part rests on said support when not in use so as to hold open a switch which closes when the hand-held part is removed from said support, said switch when closed serving to apply power to said motor and for activating a verification circuit for the duration of a verification period, which circuit indicates a malfunction of said current limiter circuit.

5. The device of claim 4 wherein said verification circuit includes a transistor connected to a resistance for discharging a test voltage, said transistor being briefly brought into a conductive state when power is applied to said motor.

6. The device of claim 5 wherein said transistor is brought into said conductive state by means of an R/C element.

* * * * *